T. F. MULLIGAN.
REGISTER ACTUATING MECHANISM FOR METERS AND THE LIKE.
APPLICATION FILED OCT. 18, 1912.
1,168,325.
Patented Jan. 18, 1916.
3 SHEETS—SHEET 1.
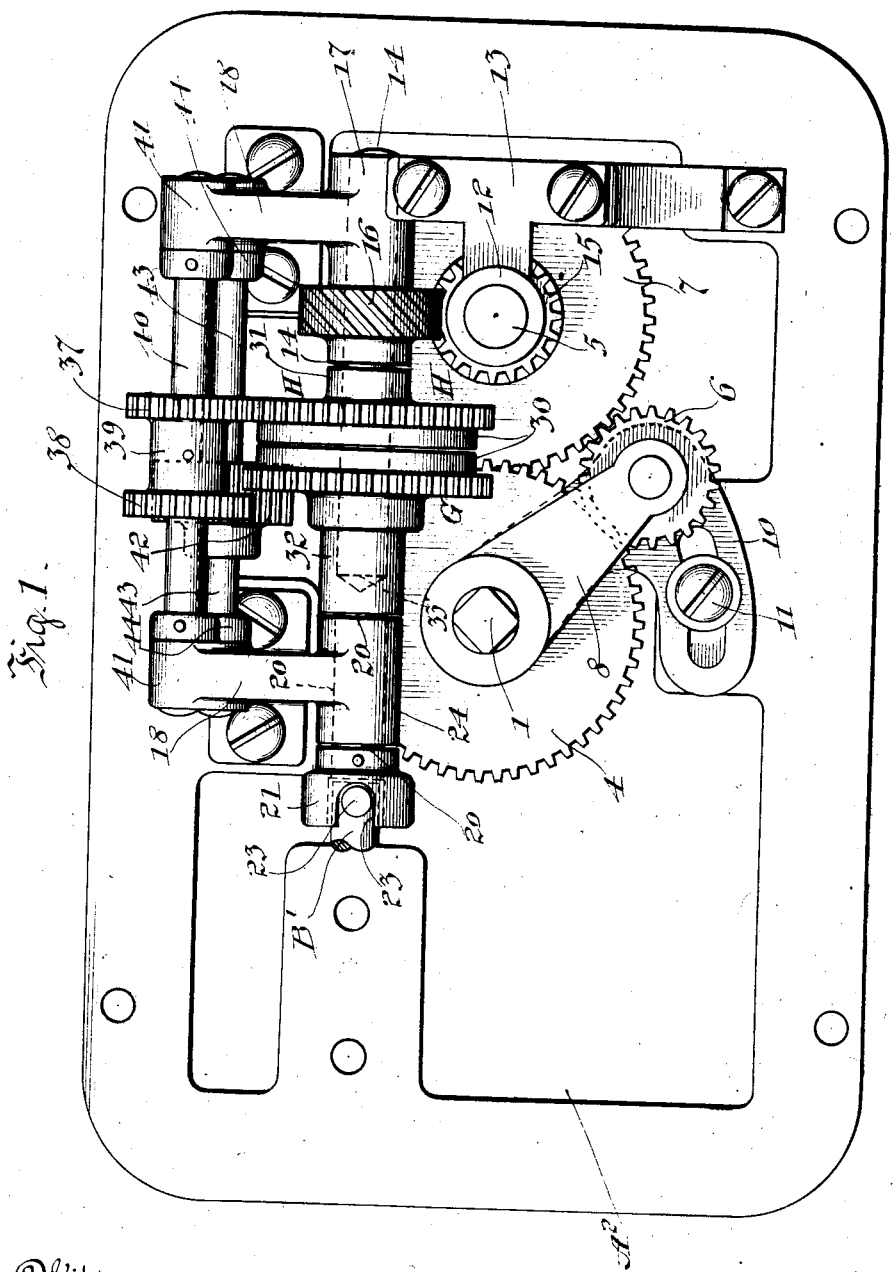

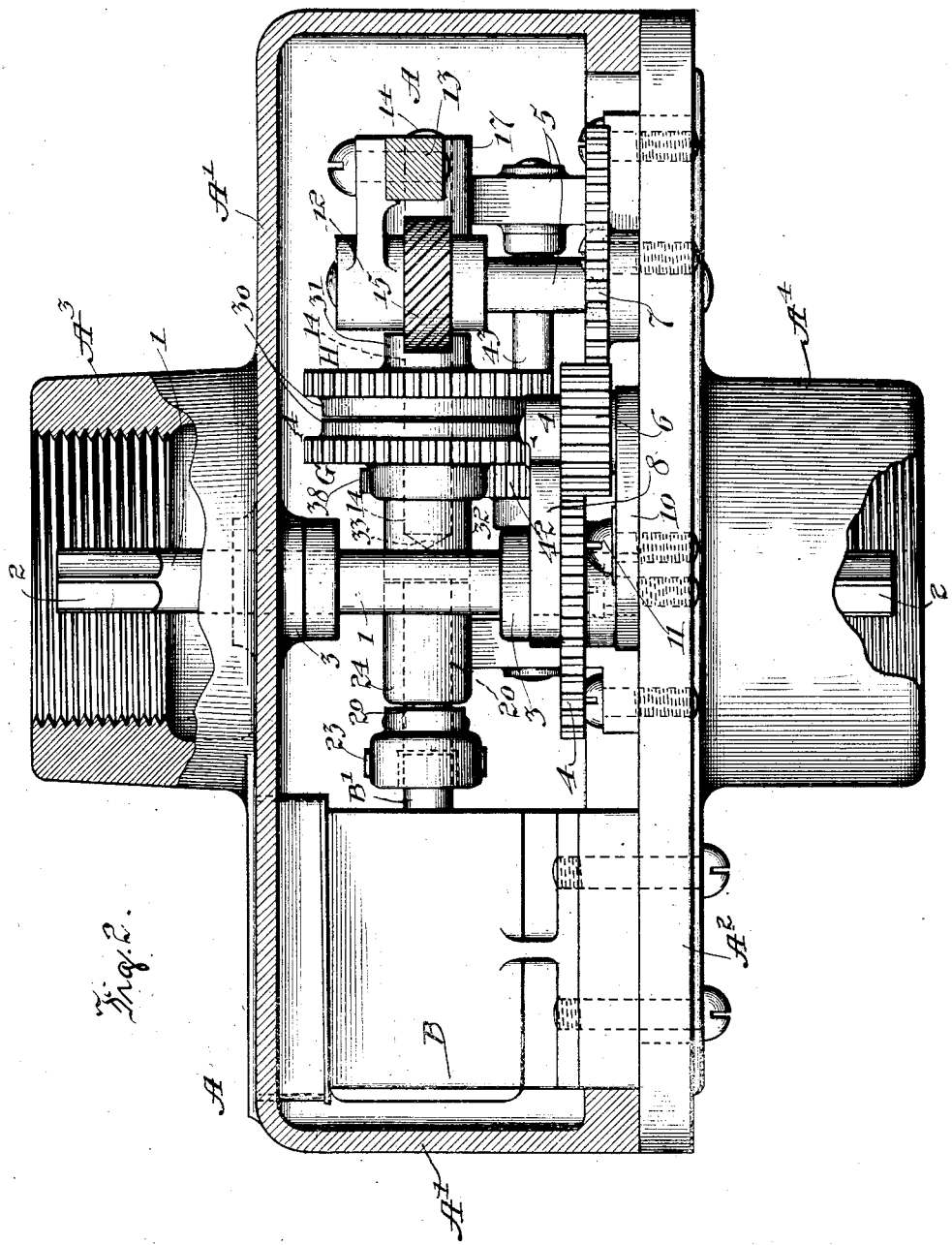

T. F. MULLIGAN.
REGISTER ACTUATING MECHANISM FOR METERS AND THE LIKE.
APPLICATION FILED OCT. 18, 1912.
1,168,325.
Patented Jan. 18, 1916.
3 SHEETS—SHEET 3.
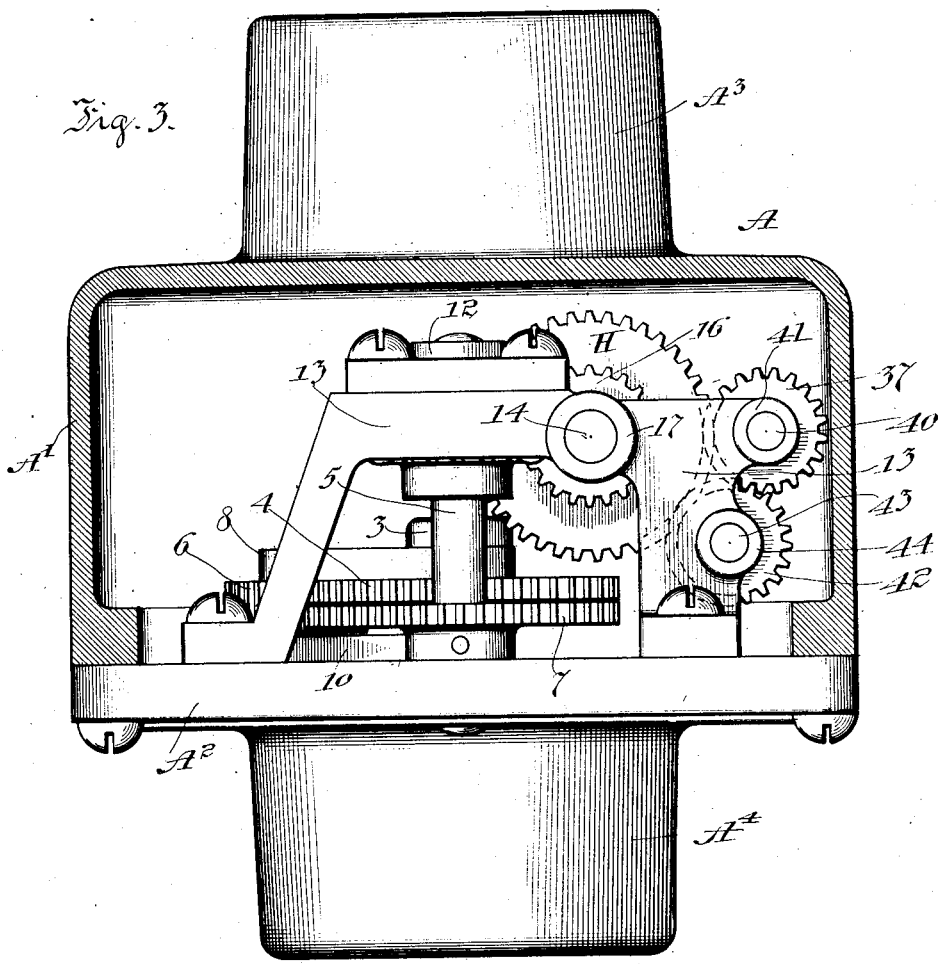
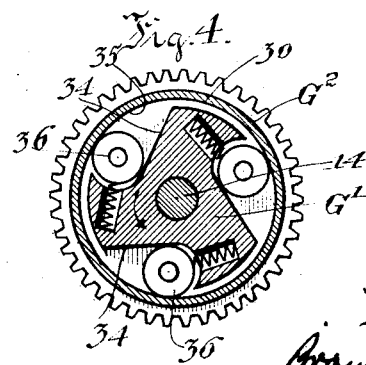

UNITED STATES PATENT OFFICE.

THOMAS F. MULLIGAN, OF FORT WAYNE, INDIANA, ASSIGNOR TO S. F. BOWSER & COMPANY, INCORPORATED, OF FORT WAYNE, INDIANA.

REGISTER-ACTUATING MECHANISM FOR METERS AND THE LIKE.

1,168,325.   Specification of Letters Patent.   Patented Jan. 18, 1916.

Application filed October 18, 1912. Serial No. 726,426.

*To all whom it may concern:*

Be it known that I, THOMAS F. MULLIGAN, a citizen of the United States, residing at Fort Wayne, in the county of Allen and State of Indiana, have invented certain new and useful Improvements in Register-Actuating Mechanism for Meters and the like, of which the following is a specification.

My invention relates to improvements in measuring mechanisms, and one of the objects of my invention is to provide an improved register actuating mechanism for meters and the like which will cumulatively actuate register or counting mechanism regardless of the direction of operation of the meter or other apparatus which is to have its operations counted.

A further object of my invention is to provide an improved mechanism which may be interposed between a driving element and a driven element to actuate said driven element in one direction regardless of the direction of said driving element.

Other objects of my invention will appear hereinafter.

My invention consists in the features of novelty exemplified in the construction, combination and arrangement of parts herein described, and shown in the accompanying drawings which illustrate one embodiment of my invention, and more particularly pointed out in the appended claims.

In the drawings Figure 1 is a top plan view of a structure embodying my invention, the cover being removed to disclose the actuating mechanism. Fig. 2 is a view in side elevation, the cover being in section. Fig. 3 is an end view, the cover being in section, and, Fig. 4 is a detail sectional view of one of the clutches, taken on line 4—4 of Fig. 2.

The structure which embodies my invention and which I have illustrated in the drawings, is adapted more especially for use in oil or liquid pumping or storage systems. In systems of this character it is customary in certain instances to pass oil or liquid through a meter into a storage tank and after the tank is full to draw off the liquid through the same pipe lines and meter in the reverse direction. It is desirable under these conditions to cumulatively count or measure the quantity of liquid which passes to and from the tank through the meter in order that an accurate check may be maintained on the quantity of liquid in the system at any time. The meters generally employed for this purpose are of the rotary type and the shaft thereof will be rotated in either direction depending upon the direction of the flow of the liquid through the meter. If the meter shaft were directly connected to a counting or registering device the quantity of liquid passing through the meter in leaving the tank would neutralize or offset the record made by the counting device when the liquid was passed through the meter into the tank.

The structure shown in the drawings is arranged to be interposed between the meter and the counting device and to actuate the counting device cumulatively or in one direction regardless of the direction of rotation of the meter.

The mechanism shown in the drawings is preferably inclosed in a suitable casing A for protection against grit, dirt or injury to its parts. This casing, for convenience, is composed of a cover $A^1$ and a bottom or base plate $A^2$. I also prefer to mount the counting device B within this inclosure so as to make a compact structure. The counter or registering device B shown is representative of any suitable type for the purpose. It is preferably of the type bearing a train of rotary counting wheels. I have not considered it necessary to detail this counter mechanism but I have, however, illustrated its shaft $B^1$ projecting from one end thereof and it is to be understood that this shaft must be rotated in one direction to progressively actuate the counter mechanism. Outstanding from both the cover and the bottom plate of the casing A are substantially cylindrical hollow bosses $A^3$ and $A^4$ forming suitable means for attaching the liquid actuated meter (not shown) and the register actuating mechanism. These connecting bosses are provided in duplicate in order to permit the mechanism being placed above or below the liquid meter, whichever happens to be the most convenient from the standpoint of installation. Carrying out this idea further I arrange the main shaft 1 of the counter actuating mechanism so that it passes entirely through the inclosure and its ends 2 project into the hollow bosses to permit suitable connection with the meter shaft at either end of said main shaft 1. The main shaft 1, as shown, is suitably journaled in bearings 3 in the cover and bottom plate of the casing A. When connected to the meter shaft it will be rotated in either direction in accordance with the direction of rotation of the meter shaft. At a point near the base plate the main shaft 1 carries a large spur gear 4 which drives a short vertical shaft 5 through the medium of the spur gears 6 and 7, the latter gear being mounted upon the short vertical shaft 5. The gear 6 is an idler gear and is mounted upon an arm 8 rotatable about the main shaft 1, so that it may be swung into and out of mesh with the gear 7. This forms a convenient and simple means by which the register actuating mechanism may be disconnected from the main shaft if desired. The arm 8 carries a curved slotted member 10 through the slot of which the bolt 11 operates to clamp and hold the idler gear 6 in or out of mesh with the gear 7. The short vertical shaft 5 is journaled at its lower end in a bearing in the base plate $A^2$ and its upper end is supported in a journal 12 formed as a part of a supporting frame 13. The shaft 5 drives a horizontal shaft or member 14 in either direction through the medium of a worm 15 and worm wheel 16, the shaft 14 being journaled in a suitable bearing 17 on the frame 13. Alined with shaft 14 is a second horizontal shaft 20 which is connected to the counter device shaft $B^1$ by means of a transversely slotted head 21 which engages a transverse pin 23 in the end of the counter device shaft $B^1$ as clearly shown in Figs. 1 and 2. The slot 23 in head 21 is open so that the counter device B may be easily disconnected by moving it endwise. The shaft 20 is journaled in a suitable bearing 24 on the supporting frame 13. Since it is connected to and drives the counter device B it must of course rotate in one direction.

In order that the shaft member 20 may be rotated in only one direction, regardless of the direction of rotation of the shaft member 14, I provide a pair of oppositely acting clutches or ratchet members G and H. These devices are similar and a description of one of them therefore is sufficient. Referring to the drawings and particularly to Fig. 4, it will be seen that each clutch comprises an inner member $G^1$ and an outer member $G^2$, the latter being provided with gear teeth on their peripheries. The outer members of these clutches or ratchets have flanges 30 projecting toward each other so as to form shallow cups, so to speak. The outer member of clutch H is supported by its hub 31 on the shaft 14 so as to be freely rotatable thereon. The outer member of clutch G, however, has its hub 32 fastened directly on the end of the one direction shaft 20, it being preferably integrally formed thereon as shown more clearly in Figs. 1 and 2. The inner end of shaft 14, as will be seen in dotted lines of Figs. 1 and 2, projects or extends into a socket 33 in the hub 32 of clutch G and is freely rotatable therein, this arrangement being merely for the purpose of properly alining the shafts 14 and 20 and the clutches G and H. The inner members $G^1$ of both clutches are preferably substantially triangular in form. They have a number of faces 34 which, in conjunction with the inner periphery 35 of the flanges 30 of the clutches, form pockets or cells having converging walls. In these cells are small rollers 36 which are constantly urged into the converging space between the inner periphery 35 of the flanges 30 and the faces 34 of the inner member, so that when the inner members of the clutches are rotated in one direction, that is, in the direction of the arrow, Fig. 4, the rollers become wedged in their pockets and grip the outer members of the clutches and impart rotation in the same direction thereto. When the inner members of the clutches are rotated in the reverse direction the rollers tend to leave the converging spaces and, in consequence, the outer members will not be rotated. The inner members of both clutches are rigidly mounted upon and rotate with the shaft 14, but their action is reverse with respect to each other. In other words, when the shaft 14 rotates in one direction the outer member of one clutch will be rotated thereby and when the shaft 14 rotates in the other direction the outer member of the other clutch will be rotated thereby. In this structure the clutches are preferably so arranged that when the shaft 14 is rotating in the direction in which the counter device should be rotated, the outer member of clutch G will be driven directly by its inner member to rotate the shaft 20 in its proper direction, but when the shaft 14 rotates in the reverse direction the outer member of clutch G is released, but the outer member of clutch H will be rotated by its inner member in said reverse direction. In order, therefore, to impart rotation in the proper direction to the shaft 20 when the shaft 14 is rotating in the said reverse direction, I provide a train of gears which impart the reverse rotation of the outer member of clutch H to the outer member of clutch G in the proper direction. Two gears 37 and 38 of this train form a pair spaced apart on their hub 39 to rotate together. These twin gears are mounted upon a suitable shaft 40 journaled in bearings 41 of the supporting frame 13. The gear 37 of this train meshes with the gear teeth of clutch H while the gear 38 drives a broad faced idler gear 42 arranged below it and mounted upon another shaft 43, this latter shaft being likewise mounted in bearings 44 of the supporting frame 13. The gear 42 in turn meshes with and drives the outer member of the clutch G. The train of gears just described are so arranged and proportioned that when the clutch H rotates with the shaft 14, it will impart motion in the proper direction to the outer member of the clutch G and the counting device driving shaft 20. Thus it is seen that no matter in which direction the liquid actuated meter operates, the motion thereof will be imparted to the counter or register device B always in one direction and, consequently, the oil or liquid which flows through the meter in either direction will be cumulatively registered or counted up upon the counting device B.

It is obvious that my invention may be embodied in other or modified structures adapted to meet other conditions without departing from the spirit or scope of the invention; for instance, other types of clutches or ratchets G and H may be employed, if desired. Again, the gears may be proportioned so that when the shaft 14 rotates in one direction the shaft 20 will be rotated in the proper direction but at a higher speed.

What I claim is:

1. In mechanism of the class described, the combination with a unidirectional shaft having a recess at one end, of a pluridirectional shaft one end of which is freely rotatable in the said recess, a pair of ratchets each adapted to engage the pluridirectional shaft in one direction of rotation thereof and one of said ratchets being positively connected to the unidirectional shaft, and mechanism for positively connecting the two oppositely rotating ratchets.

2. The combination with a unidirectional shaft having a recess in one end, of a pluridirectional shaft with one end inserted for free rotation in the recess, a ratchet positively connected to the unidirectional shaft for engaging the other shaft when it is rotated in one direction, another ratchet to engage the pluridirectional shaft only when the shaft is rotated in the opposite direction, and gears connecting the two ratchets to drive the first mentioned shaft in a single direction regardless of the direction of rotation of the pluridirectional shaft.

3. The combination with a unidirectional shaft, of a pluridirectional shaft adjacent thereto and coaxial therewith, a ratchet connected to the unidirectional shaft and adapted to engage the other shaft when the said other shaft is rotated in one direction, another ratchet freely mounted on the pluridirectional shaft but adapted to grip it when the shaft is rotated in the reverse direction, and driving mechanism positively connecting the two ratchets for driving the unidirectional shaft continuously.

4. The combination with a driving shaft and a driven shaft arranged end to end, of a ratchet positively connected to the driven shaft and adapted to grip the driving shaft for rotating the two shafts together when the driving shaft is rotated in one direction, another ratchet freely mounted on the driving shaft and adapted to grip it when the shaft is rotated in the reverse direction, gearing positively connecting the two ratchets, and means for rotating the driving shaft in either direction whereby the driven shaft is rotated in a single direction.

5. The combination with a driving shaft and a driven shaft arranged in line and adjacent to each other, of means positively connected to the driven shaft for rotating it with the driving shaft in one direction of rotation, and mechanism directly connected to said means embodying a ratchet member freely mounted on the driving shaft but adapted to engage the driving shaft when its direction of rotation is reversed so that the driven shaft may be driven continuously in one direction regardless of the direction of rotation of the driving shaft.

6. The combination of a casing, a shaft therein arranged for rotation in one direction, a transverse shaft passing through said casing and capable of connection at each end with means for driving said shaft in either direction, means actuated by said second shaft when rotated in either direction for rotating said one direction shaft and including a train of gears, and means for disconnecting one of said gears from the train.

7. The combination of a casing, a shaft passing therethrough arranged for rotation in either direction and capable of connection at each end with the means for driving said shaft, a uni-directional shaft in said casing, and means for transmitting motion from said first mentioned shaft to said uni-directional shaft including a train of gears, a removable idler gear forming an element of said train.

8. The combination of a casing, a shaft passing therethrough arranged for rotation in either direction and capable of connection at each end with the means for driving said shaft, a uni-directional shaft in said casing, means for transmitting motion from said first mentioned shaft to said uni-directional shaft including a train of gears, a removable idler gear forming an element of said train, and an adjustable arm journaled on said first mentioned shaft and carrying said removable gear.

In testimony whereof I have signed my name to this specification, in the presence of two subscribing witnesses, on this 15th day of October, A. D. 1912.

THOMAS F. MULLIGAN.

Witnesses:
J. A. MATLACK,
L. W. THOMAS.